March 9, 1948.  W. DÄLLENBACH  2,437,244
JUNCTION BETWEEN CONCENTRIC AND PARALLEL CONDUCTOR SYSTEMS
Filed June 25, 1941  2 Sheets-Sheet 1
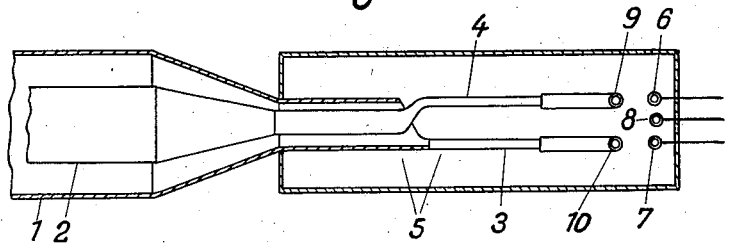
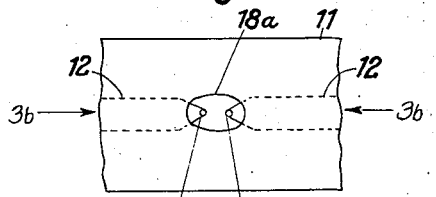
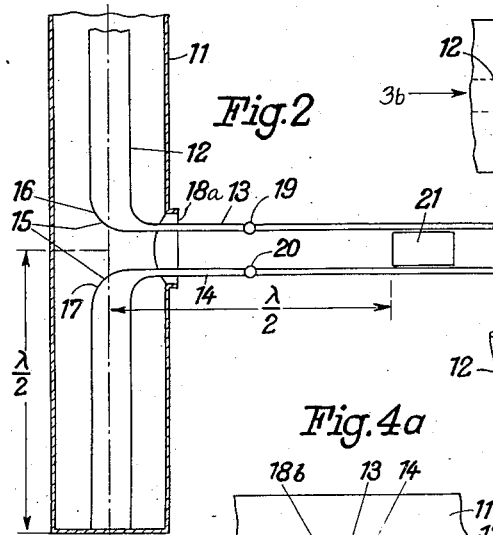
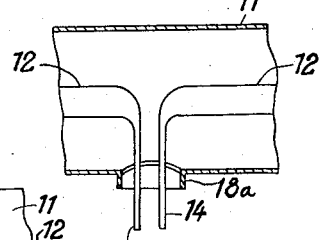
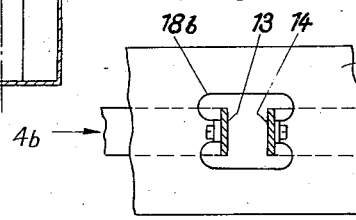
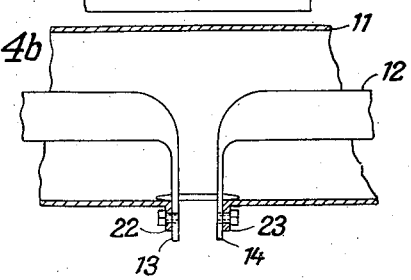
Inventor:
WALTER DALLENBACH,
BY Robert B Larson
ATTORNEY

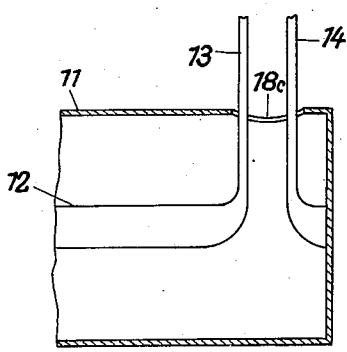
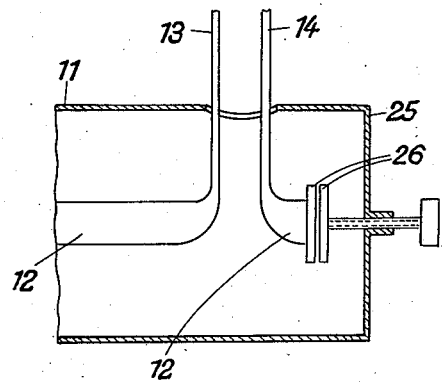
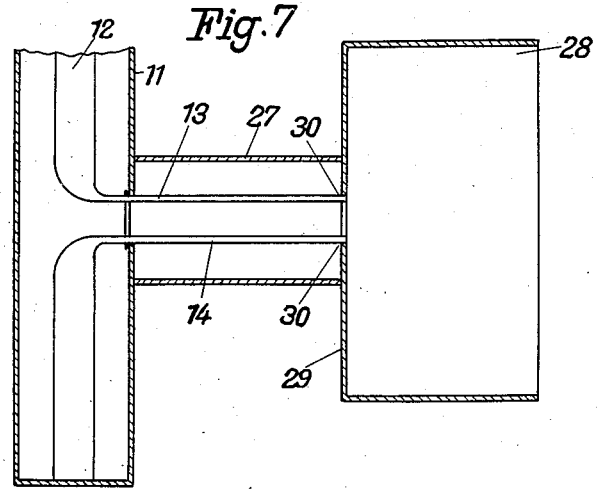
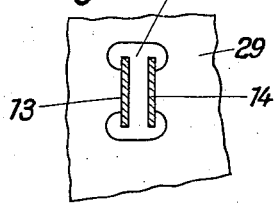
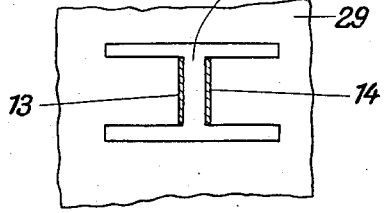

Patented Mar. 9, 1948

2,437,244

UNITED STATES PATENT OFFICE 2,437,244

JUNCTION BETWEEN CONCENTRIC AND PARALLEL CONDUCTOR SYSTEMS

Walter Dällenbach, Berlin W. 35, Germany; vested in the Attorney General of the United States Application June 25, 1941, Serial No. 399,706 In Germany July 11, 1940

1 Claim. (Cl. 178—44)

The invention refers to an arrangement for ultra short waves, especially of those of a wave length of less than 1 metre, for the transition of energy from a concentric energy line to a parallel Lecher-system consisting of wires or straps, or vice versa for the transition from a parallel Lecher-system consisting of wires or straps (in the following named as Lecher-system) to a concentric energy system.

In regard to ultra short wave devices, especially for such of a wave length of less than 1 metre the transition from a concentric energy system to a Lecher-system or vice versa is necessary for different purposes, for example, for coupling a pushpull diode for the purpose of receiving or for bridge devices at superheterodyne receivers or for the feeding of dipole aerials.

The invention now shows, how it is possible to make the changing of the energy from one system to the other in a simple way and to obtain a firm coupling between the two systems. According to the invention this is accomplished by interrupting the inner conductor of the concentric energy system and connecting the free ends to the Lechersystem, conductors of the Lecher-system at the interruption point being led through an opening in the outer conductor. If on the concentric energy system a standing wave is found, it is preferred to place the interruption point of the inner conductor at the point of a current loop (and at the immediate neighbourhood of same). Thus all the current of the concentric energy system is being forced to flow as well through the Lechersystem. The coupling of the two systems then will be especially firm.

Special explanations of the arrangement according to the invention will be given in the examples of construction as per Figs. 1 to 9 and the description made thereof.

Fig. 1 represents an arrangement which is not favourable and will be improved by the invention.

Fig. 2 shows an embodiment of the invention lateral of a concentric energy line a Lechersystem consisting of parallel wires or straps being coupled.

Figs. 3a and 3b show the same embodiment in side elevation and longitudinal section.

Figs. 4a and 4b show another embodiment of the invention in side elevation and longitudinal section.

Figs. 5 and 6 show some other embodiments of the invention.

Fig. 7 shows the lateral coupling of an antenna to a concentric energy line.

Figs. 8 and 9 show some modifications of the invention.

Fig. 1 shows the usual coupling of a push-pull diode to a concentric energy system for the purpose of receiving as being used up to now. Reference numerals 1 and 2 refer to the concentric energy system being connected to a receiving aerial. This concentric energy system will be transferred into the Lecher-system 4, 5 at the point 5 as may be seen from the drawing. At points 9 and 10 the anodes, at point 8 the leading-in of the cathode and at 6 and 7 the hot heating wire of a (not shown) duo-diode are coupled. The examination of this arrangement shows that the coupling of the concentric energy system to the Lecher-system is rather loose and that for this reason it is difficult to transfer the energy of the concentric system to the diode. Besides, the construction of the point of changing from one system into the other as per Fig. 1 is not made in a satisfactory manner.

In Fig. 2 the outer conductor of the concentric system is designated 11 and the inner conductor is designated 12. To these the Lecher-system 13, 14 has to be connected. The inner conductor 12 is interrupted at the point 15. By the interruption two free ends 16 and 17 are formed. These will be connected galvanically to the Lechersystem 13, 14 through an opening in the outer conductor. For the Lecher-system small straps having the broad sides turned to each other can be used or otherwise wires may be used. The Lecher-system may also be constructed in such way that it consists of straps near the point of interruption which gradually reduce to wires or vice versa which near the interruption point consists of wires which gradually extend to small straps.

In the case that on the concentric energy system there exists a standing wave and at the interruption point the coupled Lecher-system has a length of λ/2, the proportions and conditions of the concentric energy system must be unaltered, that is the inner conductor of the concentric energy system must be such as if it is not interrupted. In case the inner conductor is interrupted especially at the point of a current loop (and its near neighbourhood), the current of the λ/2 long parallel Lecher-system has the highest possible voltage so that in coupling the diode in its voltage loop a sufficient load is being reached. The coupling point of the anodes of the (not shown) duo-diode are designated 19, 20. The tuning of the parallel Lecher-system 13, 14 to the wanted wave length either can be done by a condenser short circuit bridge device or by a displacing body 21 which may be shifted along between the parallel wires of the Lecher-system.

Figures 3a and 3b (Fig. 3b is a section of Fig. 3a along the line 3b—3b) show in two views the construction of the point in question between the concentric system 11, 12 and the Lecher-system 13, 14 consisting of two parallel wires. The opening 18a being arranged in the outer conductor 11 and having for example an oval shape will be chosen purposely of such size that the capacitative reactance between the wires 13, 14 and the outer conductor is large compared with the wave resistance of the Lecher-system.

In case the Lecher-system consists of two flat straps, a mechanical connection between the field free outer side of the Lecher-system and the outer side of the outer conductor of the concentric energy system can be used, where the shape of the opening is suitably chosen without altering much the oscillation state on the conductor. For the purpose of better mechanical support of the straps of the Lecher-system the single straps can be fastened by angle brackets upon the outer conductor. The angle brackets should be formed in such way that metallic connections between the Lecher-system and the outer conductor of the concentric energy system only are made at the fieldless outer side of the outer conductor. In the drawings 4a and 4b (4b is a section along 4b—4b in Fig. 4a) such an example of the arrangement is shown. In Figs. 4a and 4b the reference numerals 11, 12 indicate respectively, the outer and inner conductors of the concentric system and 13, 14 the parallel conductors of the Lecher-system. The opening arranged in the outer conductor is designated 18b. The angle brackets 22, 23 are fastened with the help of screws at the straps 13, 14.

In the example of arrangement as per Fig. 2 the concentric energy system is lengthened beyond the interruption point about nearly the length of λ/2. For closing the energy system, λ/4 long pistons can be used as is described in the U. S. A. Patent 2,226,479. Thus it is possible that the mechanical connection between the conductors of the concentric energy line is arranged near a current node. By this influence of transition resistances resulting of the change from one system to the other can be avoided. Such tuning piston eventually makes it possible to compensate reactances appearing at the interruption point.

The closing of the concentric energy system also can be made immediately behind the interruption point as shown in Fig. 5. Here 11, 12 refer to the concentric system, 13, 14 refer to the Lecher-system and 18c refers to the opening being provided in the outer conductor of the concentric energy system. To get also in this case a second tuning device, as per Fig. 6, between the inner conductor 12 of the concentric system 11, 12 and the closing plate 25 a variable capacity 26 (trimming condenser) can be provided by which the reactances appearing at the interruption point of the inner conductor 12 can be compensated.

The use of the coupling of a Lecher-system to a concentric energy system is not limited in respect to the special use of the coupling of a push-pull diode to a concentric energy system, but the examples of arrangement shown in the drawings can be used quite generally for coupling a receiving diode to a concentric energy system. Other devices may be coupled in the same manner too.

The use of the device as per invention at the coupling of surface or box-like radiators (according for example to U. S. Patent to Dallenbach et al., No. 2,297,202) to an energy system shows special advantages. At these antennas the oscillation energy is transmitted immediately from hollow space like or boxlike formed metallic surfaces. Up to now it was usual to load the concentric energy system feeding the radiators in such manner that the outer conductor at the point of a current loop (and in the immediate neighbourhood of same) was interrupted over a peripheral angle of 100°. At this interruption point the radiating surface is interrupted by slitlike openings, called coupling slits. One part of the current flows from the coupling slit to the radiator and excites the latter. This part of the current is rather small. If however the inner conductor is interrupted by adding a Lecher-system according to the invention, it is possible to force practically the whole oscillation current to flow to the radiator. The radiator load thus is much bigger.

For the coupling of a boxlike surface radiator a device is constructed as shown for example in Fig. 7. The concentric energy system is designated 11, 12, the Lecher-system is designated 13, 14 and the surface radiator being coupled to the concentric energy system over the conductor 13, 14 bears the numeral 28. The Lecher-system feeding the radiator 28 is surrounded by a protecting pipe 27 which serves for the purpose of avoiding radiation and at the same time for better mechanical support of the surface radiator. On the surface 29 of the radiator 28 an opening 30 (coupling slit) is provided through which the oscillation energy flows from the concentric system to the radiator. In choosing a suitable arrangement and shape of the coupling slit 30 the radiator load for the Lecher-system can be varied essentially. Fig. 8 represents an arrangement of the coupling slit 30 being provided in the surface 29 of the radiator 28 for loose coupling between the Lecher-system 13, 14 and the surface radiator 28, being formed boxlike. A firm coupling between the Lecher-system 13, 14 and the radiator 28 is obtained by the coupling slit 30 as is shown in Fig. 9. Purposely in both cases the coupling slits 30 being provided in the surface 29 of the radiator 28 have to be shaped in such way that a variation of the oscillation state on the surface of the radiator will not take place.

A further possibility of use is given by the exciting of a hollow space resonator with the help of such parallel Lecher-systems in any current loop.

In regard to the example of using the device according to Fig. 7 only one surface radiator (boxlike radiator) is coupled to the concentric energy system. Of course also more than one radiator or a boxlike radiator can be coupled to the concentric energy system with the help of a Lecher-system. In this case (i. e., standing waves on the concentric energy system) the interruption points of the concentric system to which the Lecher-systems are connected may be arranged in or near to a current loop.

What I claim is:

An arrangement for ultra short waves, for transition of energy of a concentric energy system to a parallel Lecher-system, the combination with said Lecher-system, of concentric inner and outer conductors of the concentric energy system, the inner conductor being interrupted, the free ends of the inner conductor at the interruption point being led through an opening in the outer conductor to the outside of the concentric system, the parallel Lecher-system being connected to the free ends of the inner conductor, and variable capacitance means connected between said inner and outer conductors of said concentric system.

WALTER DÄLLENBACH.

REFERENCES CITED

The following references are of record in the file of this patent:

UNITED STATES PATENTS

| Number | Name | Date |
|---|---|---|
| 2,231,839 | Lindenblad | Feb. 11, 1941 |
| 2,249,963 | Lindenblad | July 22, 1941 |
| 2,239,905 | Trevor | Apr. 29, 1941 |
| 1,934,602 | Gilman | Nov. 7, 1933 |
| 2,250,096 | Engbert | July 22, 1941 |
| 2,189,284 | Fritz | Feb. 6, 1940 |
| 2,175,710 | Usselman | Oct. 19, 1939 |